United States Patent
Vazquez

(10) Patent No.: US 7,807,067 B2
(45) Date of Patent: Oct. 5, 2010

(54) TEXTILE TREATMENTS USING FLUOROPOLYMER-BRANCHED SILICONE POLYETHERS

(75) Inventor: Fernando Vazquez, Greensboro, NC (US)

(73) Assignee: Dow Corning Corporation, Midland, MI (US)

( * ) Notice: Subject to any disclaimer, the term of this patent is extended or adjusted under 35 U.S.C. 154(b) by 748 days.

(21) Appl. No.: 10/592,599

(22) PCT Filed: Mar. 2, 2005

(86) PCT No.: PCT/US2005/006756

§ 371 (c)(1),
(2), (4) Date: Sep. 12, 2006

(87) PCT Pub. No.: WO2005/103362

PCT Pub. Date: Nov. 3, 2005

(65) Prior Publication Data

US 2007/0190874 A1    Aug. 16, 2007

Related U.S. Application Data

(60) Provisional application No. 60/561,622, filed on Apr. 12, 2004.

(51) Int. Cl.
*D06M 15/643*    (2006.01)
*C07F 7/02*    (2006.01)

(52) U.S. Cl. ........................ 252/8.61; 252/8.62; 442/81; 556/400

(58) Field of Classification Search .................. 556/400; 252/8.61, 8.62; 442/81
See application file for complete search history.

(56) References Cited

U.S. PATENT DOCUMENTS

| 4,283,519 | A | 8/1981 | Pines et al. | |
|---|---|---|---|---|
| 4,631,208 | A | 12/1986 | Westall | |
| 4,781,844 | A | 11/1988 | Kortmann et al. | |
| 4,781,973 | A | 11/1988 | Zotto | |
| 4,853,474 | A | 8/1989 | Bahr et al. | |
| 4,929,319 | A * | 5/1990 | Dinter et al. | 204/164 |
| 4,978,462 | A | 12/1990 | Sheppard | |
| 5,136,068 | A | 8/1992 | Bahr et al. | |
| 5,387,417 | A * | 2/1995 | Rentsch | 424/401 |
| 6,171,515 | B1 | 1/2001 | Evans et al. | |
| 7,097,785 | B2 | 8/2006 | Vazquez | |
| 2004/0152617 | A1 * | 8/2004 | Murphy et al. | 510/475 |
| 2005/0166333 | A1 * | 8/2005 | Kaaret et al. | 8/115.51 |

FOREIGN PATENT DOCUMENTS

| JP | 57-154466 | 9/1982 |
|---|---|---|
| JP | 62-28471 | 2/1987 |
| JP | 10-72774 | 3/1998 |
| JP | 2001-336071 | 12/2001 |
| WO | WO 03/078504 A1 | 9/2003 |

* cited by examiner

*Primary Examiner*—Porfirio Nazario Gonzalez
(74) *Attorney, Agent, or Firm*—Alan Zombeck

(57) ABSTRACT

The treatment of textiles by a fluoropolymer-branched silicone polyether composition is disclosed. The fluoropolymer-branched silicone polyether compositions are prepared by combining a fluoropolymer and a branched silicone polyether. The resulting compositions improve the hand or feel of the fabric without significantly diminishing oil repellency nor the stain release properties associated with fluoropolymers. The branched silicone polyethers can be used alone to improve the feel of fabrics, without diminishing the hydrophilicity of the fabric.

3 Claims, No Drawings

TEXTILE TREATMENTS USING FLUOROPOLYMER-BRANCHED SILICONE POLYETHERS

CROSS REFERENCE TO RELATED APPLICATIONS

This application is a U.S. national stage filing under 35 U.S.C. §371 of PCT Application No. PCT/US2005/006756 filed on 2 Mar. 2005, currently pending, which claims the benefit of U.S. Provisional Patent Application No. 60/561,622 filed 12 Apr. 2004 under 35 U.S.C. §119 (e). PCT Application No. PCT/US2005/006756 and U.S. Provisional Patent Application No. 60/561,622 are hereby incorporated by reference.

FIELD OF THE INVENTION

This invention relates to the treatment of textiles by a fluoropolymer-branched silicone polyether composition. The fluoropolymer-branched silicone polyether compositions are prepared by combining a fluoropolymer and a branched silicone polyether. The resulting compositions improve the hand or feel of the fabric without significantly diminishing oil repellency nor stain release properties associated with fluoropolymers. The branched silicone polyethers can be used alone to improve the feel of fabrics, without diminishing the hydrophilicity of the fabric.

BACKGROUND OF THE INVENTION

Silicones are used as textile treatments to impart a variety of properties, but in particular are used for improving the feel or hand of treated fabrics. For example, reference may be had to U.S. Pat. No. 4,781,844 (Nov. 1, 1988), U.S. Pat. No. 4,978,462 (Dec. 18, 1960), and U.S. Pat. No. 6,171,515 (Jan. 9, 2001), for a description of the general state of the art. The '515 patent in particular provides a detailed overview on the use of various silicones in the textile industry.

Fluorocarbons are extensively used in the textile industry to impart water and oil repellency to fabrics. They are also used to provide stain release properties. However, one of the major drawbacks of fluorocarbon treatments is the harsh feel imparted to the fabric surface. The increasing use of fluoropolymers in apparel fabrics and garments demands a higher level of softness.

There have been several attempts to combine various fluorocarbons and silicones into a single textile treatment to offer the combined benefits of each. However, such attempts have usually resulted in comprising one or more fabric attributes. For example, the addition of a silicone to a fluorocarbon treatment composition may improve the hand of the fabric, but the oil repellency of the combined treatment is often much worse when compared to the fluorocarbon treated fabrics. Thus, there is a need to identify fluorocarbon based textile treating compositions that maintain the attributes associated with fluorocarbon treatments, but improve the deficiencies, such as poor hand.

The present inventor has discovered certain silicones, namely branched silicone polyethers, when combined with fluoropolymers, provide textile treatments that provide the positive attributes of fluoropolymers, while providing improved hand of the treated fabrics.

SUMMARY OF THE INVENTION

The present invention provides a composition comprising;
A) a fluoropolymer, and
B) a branched silicone polyether.

The invention further relates to a method of treating fibers or textiles comprising;
I) combining
  A) a fluoropolymer,
  B) a branched silicone polyether, and
II) applying the product of step I on fibers or textiles.

The present invention also provides a method of treating fibers or textiles comprising applying a branched silicone polyether to the fiber or textile.

DETAILED DESCRIPTION OF THE INVENTION

The present invention provides a composition comprising;
A) a fluoropolymer, and
B) a branched silicone polyether.

Component A) is a fluoropolymer. The fluoropolymer can be any fluorocarbon polymer, either used neat, or alternatively in an emulsion form, that is known in the art for treating fibers, fabrics, or textiles. Typically, the fluoropolymer is selected from a fluoroalkyl acrylate copolymer, a fluorinated polyurethane, an emulsion of a fluoroalkyl acrylate copolymer, or an emulsion of a fluorinated polyurethane.

A fluoroalkyl acrylate copolymer is illustrated by the formula shown below.

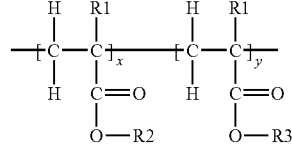

In the above structure, R1 is hydrogen or an alkyl group such as methyl; R2 represents a fluorocarbon group such as $-(CH_2)_m(CF_2)_nCF_3$; R3 represents an alkyl group such as $-(CH_2)_nCH_3$; m is 0-5; n is 2-19; and x and y have values dependent upon the desired chain length.

Emulsions containing fluoroalkyl acrylate copolymers are commercially available from companies such as Daikin Industries Ltd., Osaka, Japan, under their trademark Noveon Inc., Charlotte, N.C., under the trade mark UNIDYNE™ such as UNIDYNE™ TG-532 and UNIDYNE™ TG-992; and Ciba Specialty Chemicals Corp, High Point, N.C. under their trademark ZONYL® such as ZONYL® CO. Emulsions containing fluorinated polyurethanes are commercially available from companies such as E.I. DuPont de Nemours, Wilmington, Del., under their trademark ZONYL® such as Zonyl® 7910.

Component B) is a branched silicone polyether. As used herein, a "branched silicone polyether", (abbreviated herein as BSPE) is a cross-linked organopolysiloxane polymer having at least one polyoxyalkylene group. This class of compounds has been generally described by Bahr et. al. in U.S. Pat. Nos. 4,853,474 and 5,136,068, incorporated herein by reference to teach cross-linked organopolysiloxane polymers suitable as Component B). Compounds suitable as component B) include organopolysiloxane-polyoxyalkylene polymer molecules which are intentionally cross-linked through a cross-linking agent joined thereto by nonhydrolyzable bonds and being free of internal hydrolyzable bonds.

Component B) may be obtained by a method comprising preparing a cross-linked organopolysiloxane polymer and combining a polyoxyalkylene group therewith or by a method comprising preparing a linear polyorganosiloxane having a polyoxyalkylene group combined therewith and cross-linking the same.

The cross-linking in this system can be attained through a variety of mechanisms. Those skilled in the art will readily recognize the systems wherein the required components are mutually compatible to carry out the method of preparing component B). By way of illustration, an extensive bibliography of siloxane polymer chemistry is provided in *Siloxane Polymers*, S. J. Clarson and J. A. Semlyen eds., PTR Prentice Hall, Englewood Cliffs, N. J., (1993).

In the present invention, typically component B) is a compound having a viscosity of 100 to 100,000 mm$^2$/s at 25° C. and having the unit formula:

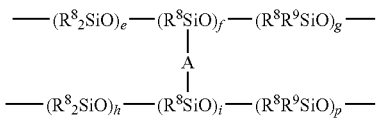

wherein $R^8$ is a monovalent hydrocarbon group, A is a group having its formula selected from $(CH_2)_q$—$(R^{10}{}_2SiO)_r Si(CH_2)_s$ or $O(R^{10}{}_2SiO)_r$—$SiO$ wherein $R^{10}$ denotes a monovalent hydrocarbon group, q has a value of 2 to 10, r has a value of 1 to 5000, s has a value of 2 to 10, $R^9$ denotes a group having its formula selected from the group consisting of:

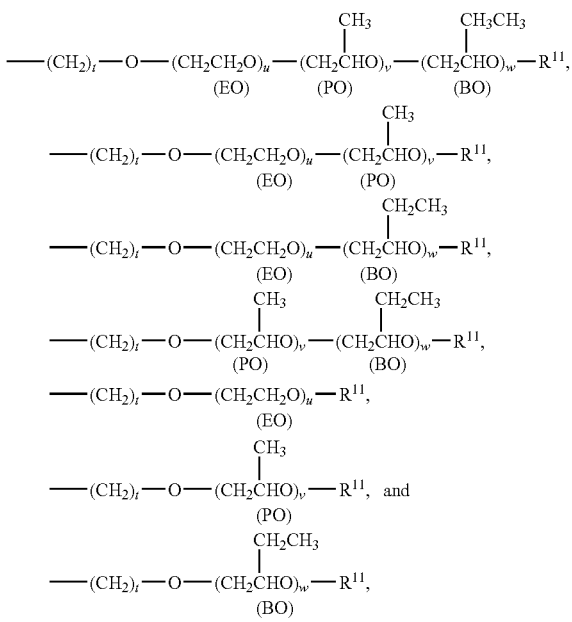

wherein $R^{11}$ is selected from a hydrogen atom, an alkyl group, an aryl group, or an acyl group, t has a value of 0 to 6, u has a value of from greater than zero to 150, v has a value of from greater than zero to 150, and w has a value of from greater than zero to 150, e has a value of 1 to 1000, f has a value of from greater than zero to 30, g has a value of 1 to 1000, h has a value of 1 to 1000, i has a value of from greater than zero to 30, p has a value of 1 to 1000. In the formula hereinabove EO, PO, and BO denote ethylene oxide, propylene oxide, and butylene oxide groups, respectively. The groups $R^8$ and $R^{10}$ can be the same or different as desired and are preferably alkyl groups or aryl groups and it is highly preferred that they are both methyl.

In the formulae hereinabove, e has a value of 1 to 500 or alternatively a value of 1 to 250, f has a value of from greater than zero to 20, or alternatively from 1 to 15, g has a value of 1 to 100 or alternatively 1 to 50, h has a value of 1 to 500 or alternatively 1 to 250, i has a value of from greater than zero to 20 or alternatively 1 to 15, p has a value of 1 to 100, or alternatively 1 to 50, q has a value of 2 to 6, r has a value of 1 to 2500, or alternatively 20 to 1000, s has a value of 2 to 6, t has a value of 0 to 3, u has a value of from 1 to 100 or alternatively 5 to 50, v has a value of from 1 to 100 or alternatively 5 to 50, w has a value of from 1 to 100 or alternatively 1 to 50.

Typically the cross-linked organopolysiloxane polymer of component B) is triorganosiloxy endblocked at each terminal of the polymer, and it is highly preferred that the polymer is trimethylsiloxy endblocked at each terminal of the cross-linked polymer.

A specific example of the method for producing the crosslinked organopolysiloxane polymers will now be described. Preparation of a crosslinked organopolysiloxane polymer can be done through the following steps: (I) a charging step in which a linear polysiloxane having hydrogen atoms in its side chains, a polysiloxane having vinyl groups and a catalyst for promoting the reaction, particularly platinum catalysts such as an isopropanol solution of $H_2PtCl_6 6H_2O$ with a 2% methanol solution of sodium acetate are put in a reactor, (II) an agitation/heating step in which agitation is conducted, for example, at 40° C. for 30 minutes, (III) an input step in which a polyoxyalkylene and a solvent (isopropanol) are put in the reactor, (IV) a reflux step in which the isopropanol is refluxed, for example, at 80° C. for 1.5 to 2 hours while monitoring the reaction rate of Si—H, (V) a stripping step in which the isopropanol is stripped, for example, at 130° C. under a reduced pressure of 25 mmHg, and (VI) a final step in which the reduced pressure condition of step (V) is released and the reaction mixture is cooled to 60° C. to obtain a final product.

An example of a linear polysiloxane having hydrogen atoms in its side chains suitable for step (I) is a polysiloxane having its formula selected from:

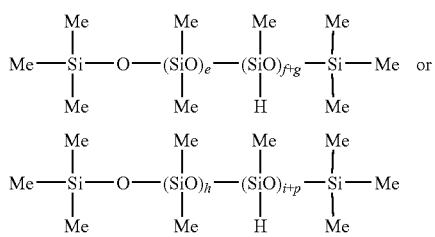

wherein Me hereinafter denotes methyl and e, f, g, h, i, and p are as defined above. An example of a polysiloxane having vinyl groups suitable for step (I) is a polysiloxane having the formula:

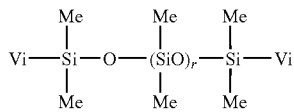

wherein Me denotes methyl, Vi hereinafter denotes vinyl, and r is as defined above. The reaction of these two compounds in step (II) results in a cross-linked siloxane polymer having the formula

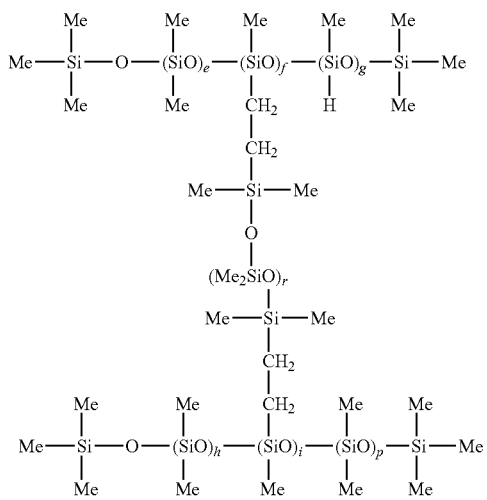

Introduction of a polyoxyalkylene group into the obtained crosslinked organopolysiloxane polymer (steps III-VI) can be accomplished by reacting the crosslinked polymer with a polyoxyalkylene compound having its formula selected from the group consisting of

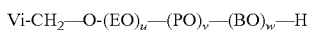

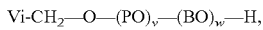

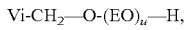

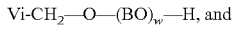, and

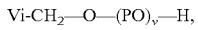

wherein Vi, EO, PO, and BO are as denoted hereinabove, and u, v, and w are as defined above.

The resulting compounds are cross-linked organopolysiloxane polymers having the formula

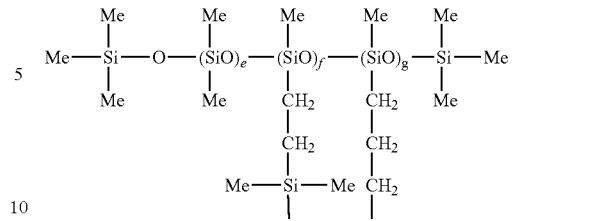

wherein Me, EO, PO, BO, e, f, g, h, i, p, and r are as defined hereinabove, u has a value of 0 to 150, v has a value of 0 to 150, and w has a value of 0 to 150, with the proviso that the value of u+v+w is at least one.

The compositions of the present invention are prepared by combining components A) and B), either before adding them to the finishing bath, by adding them separately into the finishing bath using any conventional mixing techniques, or by adding them in separate sequential steps onto the fibrous substrate. Typically, components A) and B) are combined such that the weight ratio of component A)/component B) is from 1/99 to 99/1.

The invention further provides a method of treating fibers or textiles comprising;
  I) combining,
    A) a fluoropolymer,
    B) a branched silicone polyether, and
  II) applying the product of step I on fibers or textiles.

The first step of the method is mixing a fluoropolymer and a branched silicone polyether either before adding them to the finishing bath or by adding them separately into the finishing bath or by adding them through separate sequential steps onto the fibrous substrate. The fluoropolymer A) and the branched silicone polyether B) are the same as described supra. Finishing bath may also include additional components such as, but not limited to, durable press reactants, such as dimethyloldihydroxyethylene urea (DMDHEU), reactant catalysts such as Magnesium Chloride/Citric Acid, softeners such as polyethylene emulsions, process aids such as wetting agents and other. Mixing can be performed by any conventional known techniques such as milling, blending, homogenizing, sonolating or stirring. These mixing procedures can be conducted either in a batch or continuous process.

The second step of the method comprises applying to fibers or textiles the product resulting from combining components A) and B), also referred herein as the treatment composition or the separate components A) and B) in sequential steps. The amount applied is a "hand improving" effective amount of the treatment composition and is applied to the fiber and/or textile by any convenient method. For example, the treatment composition can be applied by padding, dipping, spraying or exhausting. When the treatment composition comprises more than one solution, dispersion, or emulsion; the solutions, dispersions, and emulsions can be applied simultaneously or sequentially to the textiles. After the treatment composition is applied to the fiber and/or fabric, it can be dried by heat.

The fiber/textile treatment composition can be applied to the fiber and/or textile during making the fibers or textiles, or later such as during laundering textiles. After application, carriers (if any) can be removed from the treatment composition for example by drying the composition at ambient or elevated temperature. The amount of treatment composition applied to the fibers and textiles is typically sufficient to provide 0.1 to 15 weight percent of the composition on the fibers and textiles, based on their dry weight, preferably in an amount of 0.2 to 5 weight percent based on the dry weight of the fiber or textile.

Fibers and textiles that can be treated with the treatment composition include natural fibers such as cotton, silk, linen, and wool; regenerated fibers such as rayon and acetate; synthetic fibers such as polyesters, polyamides, polyacrylonitriles, polyethylenes, and polypropylenes; combinations, and blends thereof. The form of the fibers can include threads, filaments, tows, yarns, woven fabrics, knitted materials, nonwoven materials, paper, carpet, and leather.

The treatment composition of this invention has advantages such that it can impart combined benefits of attributes associated with silicones and fluorocarbons. Silicones generally provide superior hand to fabrics, whereas fluorocarbons contribute water repellency, oil repellency, and stain release to textiles. Hand for purposes of the invention means the softness and smoothness of the fabric. The present compositions and methods provide oil repellency properties to fibers or textiles, but without a significant detriment to the hand of treated fibers.

The present invention further provides a method of treating fibers or textiles comprising applying a branched silicone polyether to the fiber or textile. The branched silicone polyether is the same as described supra. The methods and techniques for applying the branched silicone polyether are the same as described supra. Textiles treated with the branched silicone polyether have a feel or hand comparable to premium hydrophilic silicone, but do not negatively impact the hydrophilicity of the textile.

EXAMPLES

The following examples are presented to further illustrate the compositions and methods of this invention, but are not to be construed as limiting the invention, which is delineated in the appended claims. All parts and percentages in the examples are on a weight basis and all measurements were obtained at about 23° C., unless indicated to the contrary.

Treatment of Textiles and Test Methods

Fabrics were obtained from Testfabrics Incorporated, Pittston, Pa., and included a 100 percent cotton twill Tribecka series khaki, and a No. 7409 Dacron 54/Cotton (65/35) Bleached Broadcloth and Interlock cotton knit style 460, as the standardized fabrics for use. Neither fabric had any pre-finished treatment.

Oil Repellency: Hydrocarbon Resistance Test Protocol—American Association of Textile Chemists & Colorists (AATCC) Test Method 118-1997

In this test method, a series of oils are designated with numbers 1 thru 8. The surface tension of the oil decreases as the number of the oil increases, i.e., the number 1 oil has the highest surface tension whereas the number 8 oil has a lowest surface tension. Each fabric is tested with the number oil (Kaydol) up to the number 8 oil (n-heptane), and the wetting or wicking into the fabric is noted. Values based on a rating scale of A, B, C, and D, are assigned to each oil as an indication of the contact angle of the oil applied to the surface, and at a C value, wicking and wetting of the fabric is noted, with full wicking being a rating of D. Value A is the best, value B is passing, value C indicates failure, and value D is the worst. The test protocol consists of placing 5 drops of each oil on the test fabric, waiting 30+/−2 seconds, and then assigning a score for the oil. If the score is B or better, the next higher numbered oil is tested. A score of 8A is considered the best score since it would indicate that there was no or little if any wicking and/or wetting of the fabric even with the oil having the lowest surface tension.

Water Repellency: Spray Test—AATCC Test Method 22-1996

An AATCC spray tester was used for this test. The tester included a stand with a 45° incline, above which a separatory funnel was mounted having an attached spray nozzle hanging above it. Fabric samples are fastened into a metal hoop, and placed on the incline, and the nozzle head is positioned 6 inches above it. Then, 250 milliliter of distilled water is allowed to play down onto the fabric. The wetting pattern is compared to a standard rating scale. A rating of 100 indicates no sticking or wetting of the upper surface; a rating of 90 indicates a slight random sticking or wetting of the upper surface; a rating of 80 indicates a wetting of the upper surface at the spray points; a rating of 70 indicates a partial wetting of the whole of upper surface; a rating of 50 indicates a complete wetting of the whole of the upper surface; a rating of 0 indicates a complete wetting of the whole of the upper and lower surfaces.

Water/IPA Drop Test

This method was used to evaluate the water repellency of the interlock cotton knit. In this method, solutions with ratios of water and isopropyl alcohol (IPA) from 100:0 to 0:100 are prepared, and 5 drops of each solution are placed on the surface to observe whether penetration occurs within 10 seconds. The higher the ratio of IPA in the solution, the lower the surface tension, the more difficult to repel and therefore the higher rating given, e.g. a fabric repelling 100% IPA was given a rating of 100.

Hand Testing

A panel of expert evaluators rated the fabric softness using a scale of 1 to 5. A value of 5 was used for the softest fabric and a value of 1 was given to the least soft fabric.

Finishing Procedure

Four different fluoropolymer emulsions were used in the design of the finishing formulations. Three emulsions were compositions containing a fluoroalkyl acrylate copolymers, and the other emulsion was a composition containing a fluorinated polyurethane. The emulsions containing the fluoroalkyl acrylate copolymers were obtained from Noveon Corporation, sold as Unydine® TG-532 and Unidyne® TG-992, Daikin Industries, sold as Unydine® 571 and Ciba Specialty Chemicals, sold as Zonyl® CO. The emulsion containing the fluorinated polyurethane was obtained from E.I. Dupont de Nemours, Wilmington, Del., sold as ZONYL® 7910. All these compositions are known to provide good stain repellency and/or stain release to textile substrates made of all types of fibers and fiber blends. The required amount of the emulsion components was added to the water finishing bath in order to deposit the specified amount of solids on fabric. Swatches of test fabric were cut from single bolts of fabric into square measuring 15"×15".

Finishing bath was applied to the fabric by padding where it is impregnated with the bath liquor followed by squeezing through a nip to leave a specific quantity of liquor on the substrate. After padded, the fabric was dried and cured in a laboratory stenter at 170° C., for 90 sec.

Materials

The following materials were used in the examples, as detailed below.

BSPE 1=Dow Corning® 2-5563 a branched silicone polyether (Dow Corning Corporation, Midland, Mich.)

BSPE 2=Dow Corning® 2-5785 a branched silicone polyether (Dow Corning Corporation, Midland, Mich.)

Solutions of each were prepared and applied in a stain repellent and release fabric finish formulations to different fabric substrates. The representative finishing systems were based on either fluoroalkyl acrylate copolymers or a fluorinated urethanes.

Typical Stain Repellent Finish Formulation

| Product | wt % |
|---|---|
| Branched Silicone Polyether Solution (20% Actives) | 2-8 |
| Fluoropolymer Emulsion (20-30% Solids) | 4-8 |
| Durable Press Reactant | 12.0 |
| Durable Press Resin Catalyst | 3.0 |
| Non Re-wettable Surfactant | 0.1 |
| Water | Balance |

Example 1

Evaluation of BSPE's/fluoropolymer Fabric Treatment Based on Unidyne® TG-532 System (Noveon Inc.) on 100% Khaki Cotton Twill, 1% Silicone, 1% Fluoropolymer Unidyne®-532 is a fluoroalkyl acrylate copolymer emulsion (aprox 19% actives, 25% solids) from Noveon Inc. Table 1 below shows that both BSPE 1 and BSPE 2 had and minimum impact or even improved the oil repellency in the Unidyne TG-532 system. In this fabric, which was treated with 1% Si, hand for BSPE 1 was perceived better than BSPE 2. As shown, branched spe's were compared with a commercially available amino-functional silicone, commonly used for fiber treatment.

TABLE 1

| | Oil Repellency[1] (Hydrocarbon Resistance Test-AATCC 118-1992) | | | | | | |
|---|---|---|---|---|---|---|---|
| | Oil | | | | | | |
| Treatment | 7 | 6 | 5 | 4 | 3 | 2 | 1 |
| Unidyne ® TG-532 Only | B | B+ | A- | A | A | A | A |
| Unidyne ® TG-532 & BSPE I | C | B | A- | A | A | A | A |
| Unidyne ® TG-532 & BSPE II | B | A- | A | A- | A | A | A |
| Unidyne ® TG-532 & Aminofunctional Silicone | C | C | C+ | B- | B+ | A- | A |

[1]Ratings:
A - Pass, B - Borderline pass, C & D fail

| | Hand Rating[1] | | | |
|---|---|---|---|---|
| | Treatment | | | |
| | Unidyne ® TG-532 Only | Unidyne ® TG-532 & SBG I | Unidyne ® TG-532 & SBG II | Unidyne ® Amino-functional Silicone |
| Rating | 1 | 4.6 | 4.5 | 4.25 |

[1]Relative Hand Rating obtained from a panel of expert evaluators: 1 is the least soft, 5 is the softest.

Example 2

Evaluation of BSPE's/fluoropolymer Fabric Treatment Based on Unidyne® TG-532 System (Noveon Inc.) on 65/35 Polycotton Woven, 1% Silicone, 1% Fluoropolymer Solids On polycotton both Branched spe's had a minimum impact on the oil repellency provided by the fluoropolymer while providing very good softness to the treated fabric. Softness for branched spe's was similar and perceived as mid-range among all the silicones evaluated (evaluation included conventional amino-functional silicones as well). Both branched spe's showed no impact on water repellency for polycotton. Results are shown in the tables below:

| | Oil Repellency[1] (Hydrocarbon Resistance Test-AATCC 118-1992) | | | | | | |
|---|---|---|---|---|---|---|---|
| | Oil | | | | | | |
| Treatment | 7 | 6 | 5 | 4 | 3 | 2 | 1 |
| Unidyne ® TG-532 Only | B- | B- | A | A | A | A | A |
| Unidyne ® TG-532 & BSPE I | B- | B- | B+ | A- | A | A | A |
| Unidyne ® TG-532 & BSPE II | B- | B | B | A- | A | A | A |
| Unidyne ® TG-532 & Aminofunctional Silicone | C | C+ | C+ | B- | B- | A- | A |

[1]Ratings: A - Pass, B - Borderline pass, C & D fail

Water Repellency, Spray Rating (AATCC-22)

| | Treatment | | | |
|---|---|---|---|---|
| | Unidyne ® TG-532 Only | Unidyne ® TG-532 & SBG I | Unidyne ® TG-532 & SBG II | Unidyne ® TG-532 & Aminofunctional Silicone |
| Rating | 100 | 100 | 100 | 80 |

Hand Rating$_{(1)}$

| | Treatment | | | |
|---|---|---|---|---|
| | Unidyne ® TG-532 Only | Unidyne ® TG-532 & SBG I | Unidyne ® TG-532 & SBG II | Unidyne ® TG-532 & Aminofunctional Silicone |
| Rating | 1 | 3 | 3 | 5 |

$_{(1)}$Relative Hand Rating obtained from a panel of expert evaluators: 1 is the least soft, 5 is the softest.

Example 3

Evaluation of BSPE's/fluoropolymer Fabric Treatment Based on Unidyne® TG-532 System (Noveon Inc.) on 100% Cotton Knit, 0.7% Silicone, 1.4% FC The branched silicone polyethers were evaluated on a 100% cotton knit, using 0.7% silicone and 1.4% fluorocarbon, following the procedures of example 1. The results are summarized in Table 3 below.

TABLE 3

Oil Repellency$_{(1)}$ (Hydrocarbon Resistance Test-AATCC 118-1992)

| | Oil | | | | | | |
|---|---|---|---|---|---|---|---|
| Treatment | 7 | 6 | 5 | 4 | 3 | 2 | 1 |
| Unidyne ® TG-532 Only | B+ | B+ | A− | A | A | A | A |
| Unidyne ® TG-532 & BSPE I | B+ | B+ | A− | A | A | A | A |

$_{(1)}$Ratings: A - Pass, B - Borderline pass, C & D fail

Hand Rating$_{(1)}$

| | Treatment | |
|---|---|---|
| | Unidyne ® TG-532 Only | Unidyne ® TG-532 & BSPE |
| Rating | 1 | 4 |

$_{(1)}$Relative Hand Rating obtained from a panel of expert evaluators: 1 is the least soft, 5 is the softest.

Example 4

Evaluation of BSPE's/fluoropolymer Fabric Treatment Based on Zonyl® CO System (Ciba Specialty Chemicals Corp.) on Polycotton Fabric, at 0.5% Silicone, 1% Fluoropolymer Zonyl® CO is described as a perfluoroalkyl acrylic copolymer with average of 16% actives (13-19% actives according to MSDS).

In polycotton, all the materials tested, except the competitive, performed well showing no impact on oil repellency. As far as water repellency BSPE 1 does not show any impact. Regarding softness, the BSPE provided good to this type of fabric when compared to the aminofunctional silicone included in the testing.

TABLE 4

Oil Repellency$_{(1)}$ (Hydrocarbon Resistance Test-AATCC 118-1992)

| | Oil | | | | | | |
|---|---|---|---|---|---|---|---|
| Treatment | 7 | 6 | 5 | 4 | 3 | 2 | 1 |
| Zonyl ® CO Only | B− | B− | B | A | A | A | A |
| Zonyl ® CO & BSPE I | B− | B− | B | A− | A− | A | A |
| Zonyl ® CO & Aminofunctional | B− | B− | B | B | A− | A | A |

$_{(1)}$Ratings: A - Pass, B - Borderline pass, C & D fail

Water Repellency, Spray Rating (AATCC-22)

| | Treatment | | |
|---|---|---|---|
| | Zonyl ® CO Only | Zonyl ® CO & BSPE I | Zonyl ® CO & Aminofunctional |
| Rating | 100 | 100 | 100 |

Hand Rating$_{(1)}$

| | Treatment | | |
|---|---|---|---|
| | Zonyl ® CO Only | Zonyl ® CO & BSPE I | Zonyl ® CO & Aminofunctional |
| Rating | 1 | 3.75 | 4.5 |

$_{(1)}$Relative Hand Rating obtained from a panel of expert evaluators: 1 is the least soft, 5 is the softest.

Example 5

Evaluation of BSPE's/fluoropolymer Fabric Treatment Based on Zonyl® CO System (Ciba Specialty Chemicals Corp.) on Cotton Khaki, at 0.5% Silicone, 1% Fluropolymer Oil Repellency (Hydrocarbon Resistance Test-AATCC 118-1992)

| Treatment | 7 | 6 | 5 | 4 | 3 | 2 | 1 |
|---|---|---|---|---|---|---|---|
| Zonyl ® CO Only | B- | B | A- | A- | A | A | A |
| Zonyl ® CO & BSPE II | C | B- | B | A- | A | A | A |
| Zonyl ® CO & Aminofunctional | D | C | C | B- | A- | A | A |

(1) Ratings: A - Pass, B - Borderline pass, C & D fail

Hand Rating(1)

| | Treatment | | |
|---|---|---|---|
| | Zonyl ® CO Only | Zonyl ® CO & BSPE II | Zonyl ® CO & Aminofunctional |
| Rating | 1 | 4 | 4.3 |

(1) Relative Hand Rating obtained from a panel of expert evaluators: 1 is the least soft, 5 is the softest.

Example 6

Evaluation of BSPE's/fluoropolymer Fabric Treatment based on Zonyl® CO System (Ciba Specialty Chemicals Corp.) on Cotton Khaki, 1% Silicone, 1% FC Oil Repellency(1) (Hydrocarbon Resistance Test-AATCC 118-1992)

| Treatment | 7 | 6 | 5 | 4 | 3 | 2 | 1 |
|---|---|---|---|---|---|---|---|
| Zonyl ® CO Only | B- | B- | B | B+ | A- | A | A |
| Zonyl ® CO & BSPE I | B- | B- | B- | B | A- | A | A |
| Zonyl ® CO & Other Silicone | — | — | — | C | B- | B | A- |

(1) Ratings: A - Pass, B - Borderline pass, C & D fail

Water Repellency, Spray Rating (AATCC-22)

| | Treatment | | |
|---|---|---|---|
| | Zonyl ® CO Only | Zonyl ® CO & BSPE I | Zonyl ® CO & Other Silicone |
| Rating | 100 | 85 | 75 |

Hand Rating(1)

| | Treatment | | |
|---|---|---|---|
| | Zonyl ® CO Only | Zonyl ® CO & BSPE I | Zonyl ® CO & Other Silicone |
| Rating | 1 | 4 | 5 |

(1) Relative Hand Rating obtained from a panel of expert evaluators: 1 is the least soft, 5 is the softest.

Example 7

Evaluation of BSPE's/fluoropolymer Fabric Treatment Based on Zonyl® 7910 Stain Release Fabric Treatment on Khaki Cotton Twill, 1% Silicone 1.0% FC Zonyl® 7910 is described as a fluorinated urethane with 30-35% solids content. Performance of BSG I was compared with an epoxy/polyether functional silicone which is a material normally recommended in this application Oil Repellency(1) (Hydrocarbon Resistance Test-AATCC 118-1992)

| Treatment | 7 | 6 | 5 | 4 | 3 | 2 | 1 |
|---|---|---|---|---|---|---|---|
| Zonyl ® 7910 Only | — | — | — | — | C | B+ | B+ |
| Zonyl ® 7910 & BSPE I | — | — | B- | B | B | B+ | B+ |
| Zonyl ® 7910 & BSPE II | — | — | B- | B | B | B+ | B+ |
| Zonyl ® 7910 and Epoxy/polyether functional silicone | — | — | C | B- | B- | B | B+ |

(1) Ratings: A - Pass, B - Borderline pass, C & D fail

Stain Release Rating(1) (AATCC 130-2000)

| | Oil | | |
|---|---|---|---|
| Treatment | Vegetable Oil | Mineral Oil | Dirty Motor Oil |
| Zonyl ® 7910 Only | 4.2 | 3.5 | 1 |
| Zonyl ® 7910 & BSPE I | 4.4 | 3.9 | 2.3 |
| Zonyl ® 7910 & BSPE II | 4.5 | 3.8 | 2.5 |
| Zonyl ® 7910 & Epoxy/polyether functional silicone | 4.3 | 4.0 | 2.1 |

(1) Rating: Best - 5, Worst - 1

Hand Rating(1)

| | Treatment | | | |
|---|---|---|---|---|
| | Zonyl ® 7910 Only | Zonyl ® 7910 & BSPE I | Zonyl ® 7910 & BSPE II | Zonyl ® 7910 & Epoxy/polyether Silicone |
| Rating | 1 | 4.5 | 5 | 4.0 |

(1) Relative Hand Rating obtained from a panel of expert evaluators: 1 is the least soft, 5 is the softest.

Example 8

Evaluation of BSPE's/fluoropolymer Fabric Treatment in Stain Release Systems Unidyne™ TG-992 is described as a fluoroacrylate copolymer emulsion with 20-25% solids. Performance of BSG I was compared with an epoxy/polyether functional silicone which is the standard material used in this application

| | Stain Release Rating[1] (AATCC 130-2000) | |
|---|---|---|
| | Oil | |
| Treatment | Mineral Oil | Dirty Motor Oil |
| Unidyne TG-992 Only | 4 | 1.2 |
| Unidyne TG-992 & BSPE I | 3.75 | 1.6 |
| Unidyne TG-992 & Epoxy/polyether functional Silicone | 3.5 | 1.7 |

[1]Rating: Best - 5, Worst - 1

| | Hand Rating[1] | | |
|---|---|---|---|
| | Treatment | | |
| | Unidyne Only | Unidyne & Epoxy/polyether silicone | Unidyne & BSPE I |
| Rating | 1 | 2.5 | 3.6 |

[1]Relative Hand Rating obtained from a panel of expert evaluators: 1 is the least soft, 5 is the softest.

Example 9

Branched Spe's as Hydrophilic Textile Finishes

Branched spe's have shown that can provided very good softness to textile substrates with minimum impact on their natural absorbency.

| | Absorbency, sec[1] (AATCC) | |
|---|---|---|
| | Oil | |
| Treatment | Cotton Knit | Cotton Terry |
| Untreated | <1 | <1 |
| BSPE I | <1 | <1 |
| BSPE II | <1 | <1 |
| Premium Silicone Hydrophilic Softener | 2.7 | 10 sec |

| | Hand Rating[1] | | | |
|---|---|---|---|---|
| | Treatment | | | |
| | Untreated | BSPE I | BSPE II | Premium Silicone Hydrophilic Softener |
| Cotton Knit | 1 | 3.5 | 4.5 | 5 |
| Cotton Towel | 1 | 3 | 4 | 5 |

[1]Relative Hand Rating obtained from a panel of expert evaluators: 1 is the least soft, 5 is the softest.

| | Whiteness Index[1] | | | |
|---|---|---|---|---|
| | Treatment | | | |
| | Untreated | BSPE I | BSPE II | Premium Silicone Hydrophilic Softener |
| Cotton Knit | 79.9 | 79.7 | 79.6 | 77.9 |
| Cotton Towel | 123.6 | 123.2 | 123.1 | 118.2 |

[1]Hunter Lab Colorimeter. Fabric dried at 170 C. for 2 min.

The invention claimed is:

1. A fabric treatment composition comprising;
   A) a fluoropolymer,
   B) a cross-linked organopolysiloxane polymer having at least one polyoxyalkylene group.

2. The fabric treatment composition according to claim 1, wherein the cross-linked organopolysiloxane polymer has the formula:

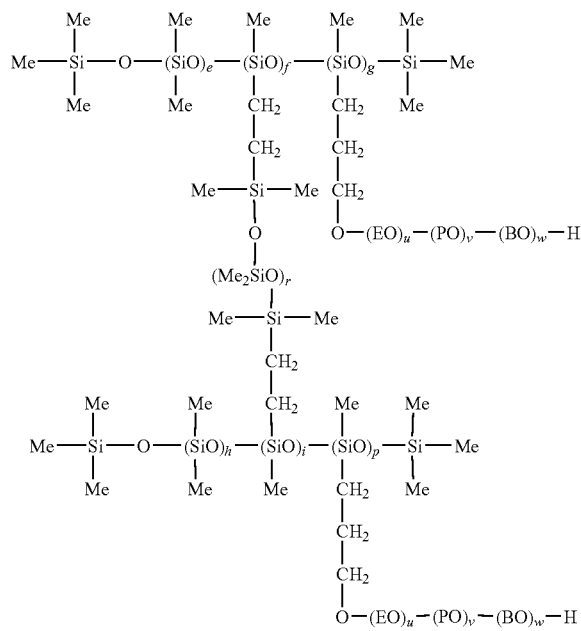

wherein Me denotes methyl, EO denotes ethylene oxide, PO denotes propylene oxide, BO denotes butylene oxide, e has a value of 1 to 1000, f has a value of from greater than zero to 30, g has a value of 1 to 1000, h has a value of 1 to 1000, i has a value of from greater than zero to 30, p has a value of 1 to 1000, r has a value of 1 to 5000, u has a value of 0 to 150, v has a value of 0 to 150, and w has a value of 0 to 150, with the proviso that the value of u+v+w is at least one.

3. The fabric treatment composition according to claim 1 wherein the fluoropolymer is selected from a fluoroalkyl acrylate copolymer, a fluorinated polyurethane, an emulsion of a fluoroalkyl acrylate copolymer, or an emulsion of a fluorinated polyurethane.

* * * * *